Feb. 11, 1958
C. A. VOSSBERG
2,823,319
PRECISION PULSE POWER GENERATOR
Filed Aug. 16, 1956
2 Sheets—Sheet 1
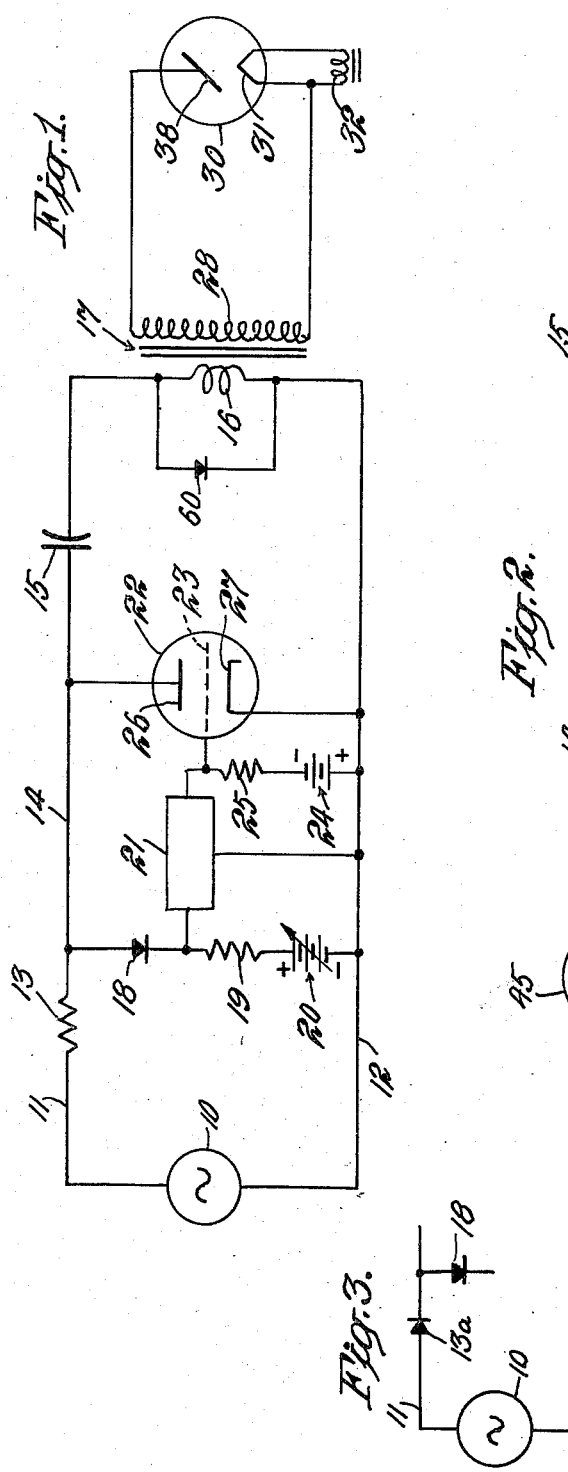
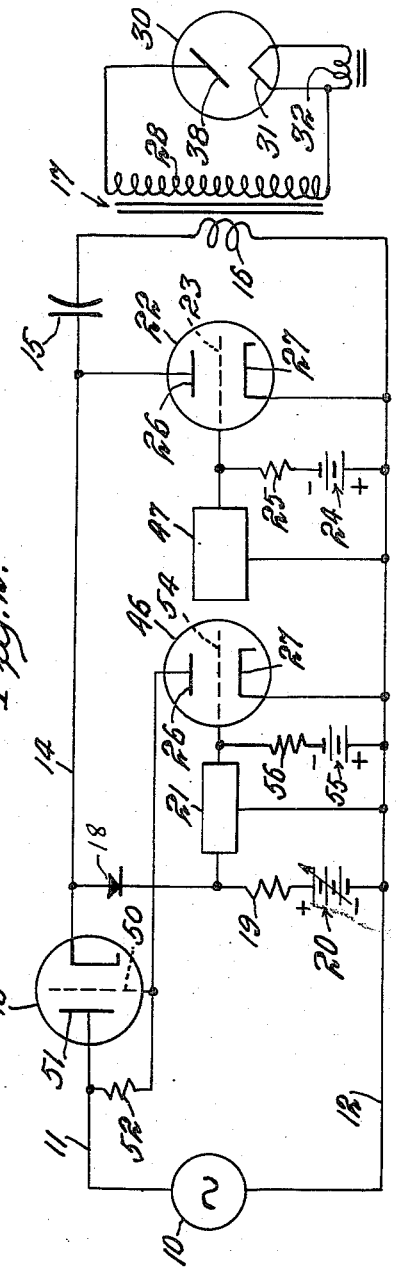
INVENTOR.
Carl A. Vossberg
BY
ATTORNEY

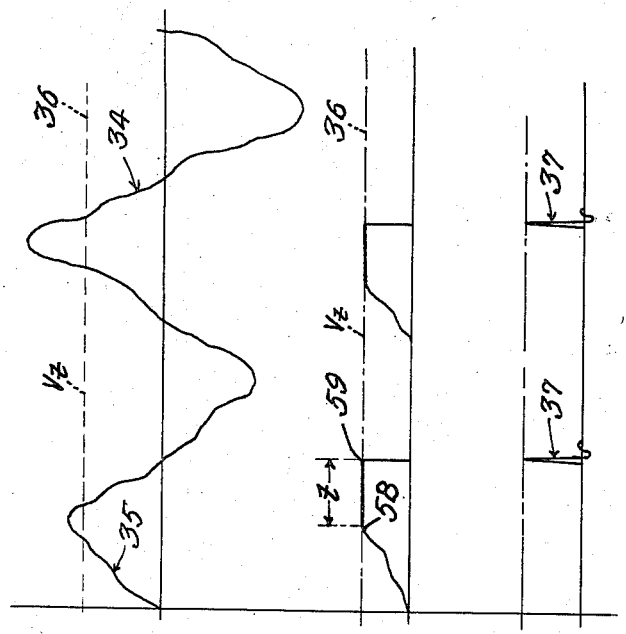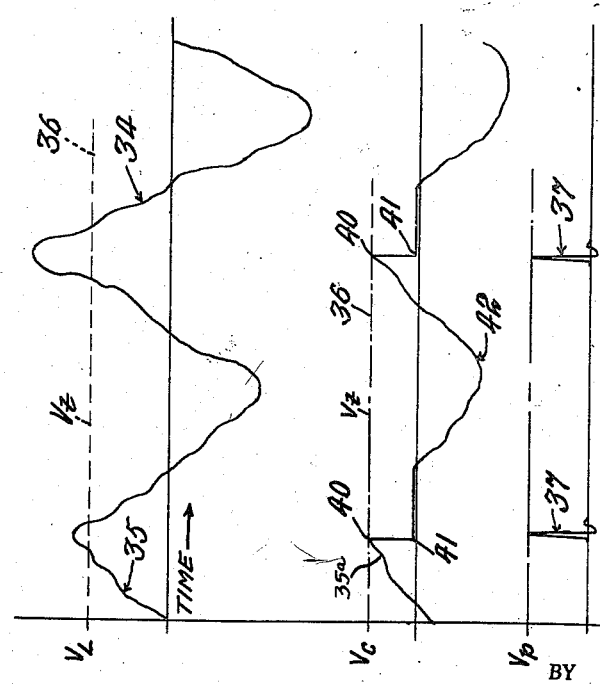

United States Patent Office 2,823,319
Patented Feb. 11, 1958

2,823,319

PRECISION PULSE POWER GENERATOR

Carl A. Vossberg, Umatilla, Fla.

Application August 16, 1956, Serial No. 604,510

19 Claims. (Cl. 250—98)

The present invention relates to means for producing a precisely regulated pulsed voltage suitable for energizing electrical equipment of which the output is critically dependent upon the character of such energizing voltage. For example, in a thickness measurement gauge of the X-ray type, the output must be constant or the gauge would be useless.

The invention provides a regulator for pulsed electrical energy which is used for energizing such equipment and more particularly provides a regulator of this character wherein each of a series of regularly repeated pulses is individually tailored to have the same peak amplitude, energy content, waveshape and other characteristics so that such energizing voltage will be precisely uniform.

The precision with which each pulse is tailored is of such a degree that the pulses may be advantageously used for the excitation of the aforementioned X-ray type of gauge or any other similar voltage-sensitive equipment. The series of pulses is controlled by the regulator so that each pulse is sufficiently independent of line voltage fluctuations to provide a constant or standard source of energy with a minimum of component parts and thus provide a simple, economical and reliable source of precisely regulated energy.

A feature of the invention resides in its ability to deliver substantial amounts of such precisely regulated electrical energy without resorting to conventional voltage regulators which, in addition to being relatively slow-acting, are cumbersome and costly particularly, in the higher power ratings.

Briefly, the invention utilizes an alternating current supply circuit to energize a load. It includes a capacitor which is charged from the line, a potential responsive circuit which is actuated during each cycle of the power supply circuit at the instant when the capacitor has become charged to a precisely predetermined potential, and a fast-acting circuit control device which is responsive to actuation of the potential responsive circuit and which connects the capacitor to be discharged into the load without further regulation when the predetermined charging potential has been reached.

Various additional features, objects and advantages of the invention will become apparent upon reading the following specification together with the accompanying drawing forming a part hereof.

Referring to the drawing:

Figure 1 is a circuit diagram of a regulator embodying the invention, the regulator being illustratively shown connected to control the energization of an X-ray tube;

Figure 2 is a circuit diagram of a modified form of the invention;

Figure 3 is a fragment of a circuit diagram similar to Figure 1 illustrating a modification of Figure 1;

Figure 4 is a waveshape diagram illustrating various voltages in Figure 1 plotted as ordinates against time as abscissae using a common time scale; and Figure 5 is a diagram similar to Figure 3, the voltages illustrated being for the circuit diagram of Figure 2.

Referring to Figure 1, an alternator 10 is shown connected to a power supply circuit comprising upper and lower (as shown) conductors 11 and 12. The upper power supply conductor 11 is connected through an impedance shown as a current limiting resistor 13 and a further conductor 14 to one terminal of a pulsing capacitor 15. The other terminal of capacitor 15 is connected through the primary winding 16 of a transformer 17 to the lower power supply conductor 12.

Conductor 14 is also connected to a threshold circuit comprising a unidirectionally conductive diode 18, a resistor 19 and a source 20 of reference potential diagrammatically indicated as an adjustable battery. The source 20 of reference potential may take any desired form which provides a constant and highly stable source of direct current potential.

The junction between diode 18 and resistor 19 in the threshold circuit 18, 19, 20 is connected through an amplifier 21 to a fast-acting circuit control or switching device illustratively shown as a thyratron 22. The output of amplifier 21 is connected to the control grid 23 of thyratron 22. The thyratron 22 is normally biased to cut-off by a biasing potential derived from a battery 24 through a grid resistor 25. The anode 26 and cathode 27 of thyratron 22 are connected between conductors 14 and 12 to discharge the capacitor 15 through the transformer primary winding 16 as described below.

For purposes of illustration, the secondary winding 28 of transformer 17 is shown connected to energize an X-ray tube 30. The filament 31 of X-ray tube 30 is energized from a suitable source of heating current shown as a transformer secondary winding 32. It will be apparent, however, that the regulator may be used to energize other forms of load requiring regulated pulse excitation such as magnetrons, luminous radiators, sonic transducers and the like.

In operation, it is assumed that the voltage $V_L$ on power supply conductors 11 and 12 will have the somewhat irregular generally sinusoidal waveshape for two successive cycles which is indicated by the curve 34 in Figure 4. As shown, waveshape irregularities are present which have been exaggerated for emphasis and for a clearer understanding of the manner of operation of the regulator.

During the first portion 35 of the first cycle, conductor 11 has a positive going potential applied thereto. Accordingly capacitor 15 becomes charged through limiting resistor 13 in series with the primary winding 16 of output transformer 17. The charging rate is sufficiently low so that the impedance of primary winding 16 has little or no effect. The voltage $V_c$ across capacitor 15 during charging is indicated at 35a in Figure 4. Thyratron 22 is inactive during charging of capacitor 15, being biased to cut off. No current flows in threshold circuit 18, 19, 20 because during the initial portion 35 of the first half wave, the line volatge is less than the reference voltage $V_t$ of source 20. The voltage $V_t$ is indicated in Figure 4 by the horizontal dotted line 36. As soon as the capacitor voltage $V_c$ exceeds the reference voltage $V_t$ of the threshold circuit, current flows through the diode 18 and the resulting voltage change at resistor 19 is amplified by the amplifier 21, thus firing the thyratron 22. The firing of thyratron 22 abruptly connects the charged capacitor 15 across the primary winding 16 of output transformer 17 so that an output pulse 37 is generated in the secondary winding 28 of transformer 17 and is delivered to the X-ray tube 30, the polarity of the pulse being such as to cause X-ray emission from the anode or target 38 of the X-ray tube. The pulse voltage $V_p$ is precisely uniform.

Upon the firing of thyratron 22, a substantially direct connection, except for the internal voltage drop in thyratron 22, is established from the charged pulsing capacitor 15 to the transformer primary winding 16 so that the voltage of capacitor 15 drops with great rapidity from the maximum value indicated at 40 to zero as indicated at 41. The voltage of capacitor 15 is held clamped substantially at zero until thyratron 22 deionizes. Deionization takes place when the polarity of the line voltage approaches zero or reverses so that conductor 14 becomes negative. Capacitor 15 becomes charged and discharged in the reverse direction in series with the limiting resistor 13, the limited reverse current having no operational effect on the transformer 17 or X-ray tube 30. The voltage $V_c$ of capacitor 15 during reverse current flow is indicated at 42 in Figure 4. Additionally, it should be noted that the output voltage of secondary winding 28 during the limited flow of reverse charging current through capacitor 15 is in the non-conductive direction with respect to X-ray tube 30 so that this reverse current can have no possible effect upon the precisely controlled stability of its output of X-rays.

By way of example, and assuming a supply voltage of 800 volts 60 cycles applied to conductors 11 and 12 by alternator 10, the several circuit components listed below will have the following characteristics for supplying an X-ray tube rated at 5 milliamperes, 25 kilovolts:

Resistor 13 _____ 1000 ohms, 500 watts.
Resistor 19 _____ 500,000 ohms, 1 watt.
Rectifier 18 _____ 1 ma., 1200 inverse volts.
Reference source 20 _____ 20 to 500 volts.
Amplifier 21 _____ Gain 60 db.
Thyratron 22 _____ Type EL-C3J/A.
Grid resistor 25 _____ 1 megohm, 1 watt.
Biasing source 24 _____ 20 volts.
Pulsing capacitor 15 _____ 0.5 mfd., 1500 working volts.
Transformer 17 _____ Turn ratio 50 to 1.

Figure 2 shows a modified form of the invention in which the limiting resistor 13 has been replaced by a control tube 45 which terminates the charging of the pulsing capacitor 15 in cooperation with a light duty thyratron 46. The capacitor discharging thyratron 22 is connected as in Figure 1 except that its grid 23 is controlled by a separate pulsing circuit 47 instead of by the amplifier 21.

While the light duty thyratron 46 is unfired, the grid 50 of control tube 45 is held positive with respect to its cathode through a resistor 52. The grid 54 of light duty thyratron 46 is normally biased to cut off by a biasing potential derived from a suitable source 55 shown as a battery. A grid resistor 56 is included between the grid 54 and biasing source 55. The grid 54 is connected to the output of amplifier 21. The input of amplifier 21 is connected, as in the case of Figure 1, to the junction between diode 18 and resistor 19 of the threshold circuit 18, 19, 20. When capacitor 15 has become charged to the potential determined by reference source 20, current flows through the threshold circuit 18, 19, 20 and is amplified by amplifier 21 thereby firing the light duty thyratron 46. This connects the grid 50 of control tube 45 with the conductor 12 at the negative going on lower of the supply circuit, thereby shutting off control tube 45. Charging of the pulsing capacitor 15 is thus terminated, as in the case of Figure 1, in accordance with accurately predetermined reference potential of source 20. Neglecting leakage, at the next cycle, control tube 45 will again shut off at the same potential, at which potential the capacitor 15 remains charged, the flow of charging current being negligible, or at least only sufficient to maintain capacitor 15 fully charged to the predetermined potential established by reference source 20.

The pulser 47 may be a simple phase shifter which operates in synchronism with the voltage on the supply conductors 11 and 12. The waveshapes shown in Figure 5 are based on this type of operation. The capacitor 15 becomes fully charged to the threshold voltage $V_t$ at point 58 and is discharged by pulser 47 at point 59. The points 58 and 59 are separated by a time interval $t$ so that discharge of capacitor 15 takes place substantially at the instant of zero line voltage.

The pulser 47 may also be a multivibrator energized from the supply circuit 11, 12 and which produces pulses at a frequency lower than the line frequency so that the pulses are more widely spaced apart than shown in Figures 4 and 5.

The pulser 47 may operate on any desired time schedule provided that the discharge intervals are spaced apart sufficiently so that capacitor 15 is always correctly charged at the instant of discharge.

Figure 3 shows a modification of Figure 1 in which the current limiting impedance is a rectifier or diode 13a instead of a resistor 13. This permits a more rapid charging of capacitor 15 than might be possible through resistor 13 and at the same time prevents appreciable reverse current flow when power supply conductor 11 is negative with respect to conductor 12. The resistance of rectifier 13a in the forward direction must, of course, be sufficient to prevent overloading of thyratron 22 during the discharge of capacitor 15. A suitable series resistor may be used to build up the forward resistance of rectifier 13a if necessary.

In the foregoing description, the tube 22 has been considered to be a thyratron. For some purposes, however, it may be advantageous to use a relay, or a hard-tube switcher, or any other switching means which will connect the charged capacitor 15 to the transformer primary winding 16 at the appropriate times. In Figure 1, the connection established by the thyratron or switcher is made once during each cycle and in Figure 2 the connection is made once during each cycle provided the pulser 47 is a phase shifter and operates in the manner indicated in Figure 5. It should be appreciated, however, that the pulser 47 may operate on an irregular time schedule synchronized with the occurrence of some independent event, such as the presence in an X-ray thickness gauge of an individual specimen to be tested, in instances where a single pulse produces a sufficient amount of X-ray radiation for a single measurement.

It has been assumed, for purposes of illustration, that the alternator 10 is a source of 60 cycle current such as commercial power supply mains. The source of regulated pulsed power provided by the invention is equally adaptable to operation at much higher frequencies, such as 400 cycles, for instance. By the use of hydrogen thyratrons or hard-tube switchers, the operating frequency may be materially increased.

The current limiting impedance 13 may also take the form of a non-linear network. Such a network may provide a constant current into the capacitor 15 during charging which would be beneficial to the accuracy of regulation if the amplifier 21 has a relatively long time lag. Such a charging current produces a linear rise in voltage across capacitor 15 so that a constant time delay in the amplifier 21 and the firing of thyratron 22 will not affect the precision of the voltage to wihch the capacitor 15 is charged at the instant of discharge.

Additionally, the capacitor 15 may be replaced by a pulse forming network the output of which is connected to the transformer secondary winding 16 by thyratron 22 at the instant when its input voltage has attained a precisely measured value as ascertained by threshold circuit 18, 19, 20. Suitable pulse forming networks are well known in the art and for this reason, no specific example of such a network is disclosed, the same applying to the non-linear network.

If desired, a swamping diode 60 may be connected across the terminals of primary winding 16, the diode being poled as shown to bypass current in the direction opposite to current flow during pulse-forming discharge of capacitor 15. This reduces any tendency for overshooting the pulses.

In the embodiments of the invention which has been disclosed, the threshold voltage $V_t$, to which the capacitor 15 becomes charged, is entirely independent of characteristics of the line voltage, such as wave shape, harmonics, high frequency components, spurious transients, or the like. The capacitor is either discharged or its further charging terminated as soon as the capacitor 15 becomes charged to a terminal potential $V_t$ which is determined with precision by the threshold circuit 18, 19, 20.

When an X-ray tube is energized from a regulated pulse generator in accordance with the present invention, as shown, the emitted dosage will be negligible because of the pulsed nature of the X-ray radiation. Accordingly, the radiation hazard to personnel is greatly reduced if not completely eliminated.

The apparatus of Figure 2 may be conveniently modified so that it operates substantially in the same manner as Figure 1, i. e., without delay after the capacitor 15 has become charged to the potential $V_t$. For this purpose, the pulser 47 may be omitted and the grid 23 of thyratron 22 connected to amplifier 21 to be triggered simultaneously with the tube 46. For this purpose, amplifier 21 may have two separate outputs to avoid possible interaction between the two circuits of grids 23 and 54 or to accommodate different grid potentials. With this modified arrangement, the thyratron 22 conducts only during the discharge of capacitor 15 and the tube 45 conducts only during charging of capacitor 15. As a result, the average current handled by tube 45 and thyratron 22 is reduced permitting the use of tubes of lower rating than for Figure 1, although a larger number of tubes are employed.

The important feature of any of the embodiments of the invention is the fact that the capacitor 15 is only charged to a certain voltage which is precisely controlled by the reference source 20 of the threshold circuit, thereby permitting the capacitor to be discharged into the load circuit without any regulation of the discharge.

While I have shown what I believe to be the best embodiments of my invention it will be apparent to those skilled in the art that many changes and modifications may be made in the pulse sources shown without departing from the spirit and scope of the invention as defined in the appended claims.

What is claimed is:

1. A pulse regulator of the class described, comprising in combination, an input circuit adapted for energization from an alternating current source, an output circuit adapted for connection to utilization means, energy storage means, circuit control means for connecting said storage means to said output circuit to produce a discharge of energy therefrom, circuit means connecting said storage means to said input circuit to be energized therefrom, and a threshold circuit connected to said storage means and to said circuit means, said threshold circuit being further connected to said circuit control means, said threshold circuit actuating said circuit control means for terminating said energizing of said storage means when it has become energized to a predetermined fixed energy level determined by said threshold circuit, whereby operation of said circuit control means after said termination of said energizing will produce a pulse of predetermined precisely fixed magnitude in said output circuit notwithstanding voltage fluctuations in said alternating current source.

2. A regulator according to claim 1, in which said threshold circuit comprises an energy level comparison standard of precisely constant magnitude and means for comparing said energy level of said storage means with said comparison standard.

3. A source of regularly repeated substantially identical pulses comprising in combination, an alternating current input circuit, a pulsing capacitor, means interposed between said input circuit and said capacitor for delivering a charging current to said capacitor during each cycle of said alternating current, voltage responsive means connected to said capacitor, said voltage responsive means being actuated in response to the charging of said capacitor to a fixed accurately predetermined potential, and circuit control means responsive to actuation of said voltage responsive means, said circuit control means being connected to discharge said capacitor upon actuation of said voltage responsive means for producing one of said pulses by said discharge.

4. Means for generating a regularly repeated series of substantially identical electrical pulses, said generating means comprising in combination, an input energization circuit adapted to be connected to a source of alternating current, a pulsing capacitor connected to said energization circuit, a current limiting impedance interposed between said capacitor and said energization circuit whereby a limited charging current is received by said capacitor during each cycle of said alternating current, a threshold circuit connected to said capacitor, current flow through said threshold circuit commencing only after said capacitor has become charged to a predetermined fixed reference potential, circuit control means connected to discharge said capacitor in response to current flow through said threshold circuit, and pulse deriving means included in the discharge circuit of said capacitor.

5. A regulator for supplying constant power to pulse energized utilization means, said regulator comprising, an input circuit adapted to be energized from an alternating current source, an output circuit adapted to be connected to said utilization means, a current limiting impedance connected to said input circuit, a pulsing capacitor connected to said input circuit through said impedance, a transformer having a primary winding connected to said capacitor and a secondary winding connected to said output circuit, switching means connected to said primary winding and said capacitor, a threshold circuit connected to said capacitor, said threshold circuit being connected to said switching means to cause discharge of said capacitor into said primary winding when said capacitor has become charged to a predetermined fixed potential through said impedance.

6. A regulator according to claim 5, in which said threshold circuit includes a direct current source of reference potential of precisely constant magnitude and rectifier means connected in series with said source of reference potential for permitting current flow through said threshold circuit only after said capacitor has become charged to a potential exceeding said reference potential.

7. A regulator according to claim 5 in which said impedance is unidirectional conductive.

8. A regulator according to claim 5 in which said switching means is a thyratron.

9. Means for generating a regularly repeated series of substantially identical electrical pulses, said generating means comprising in combination, a capacitor, a transformer primary winding and a gas discharge tube connected in series, a charging circuit for said capacitor, voltage sensitive means connected to said capacitor and to said charging circuit, said voltage sensitive means being actuable when said capacitor has become charged to a predetermined precisely fixed potential to terminate further charging of said capacitor, and cyclically operative means for firing said discharge tube with said capacitor in a charged condition to produce uniform pulse excitation of said transformer primary winding.

10. Means according to claim 9, in which said cyclically operative means comprises an amplifier having its input connected to said voltage sensitive means and its output connected to said gas discharge tube.

11. Means according to claim 9, further comprising a swamping diode connected across said primary winding.

12. Means for generating a regularly repeated series of precisely uniform electrical pulses, said generating means comprising in combination, a discharge circuit consisting in its entirety of a capacitor, switching means and a transformer primary winding all connected in series, a power supply circuit adapted to be energized from a source of alternating current, means including a current limiting impedance connecting said capacitor to said power supply circuit to be charged therefrom with one polarity of said alternating current, a threshold circuit connected to said capacitor, said threshold circuit being actuated when said capacitor has become charged to a precisely predetermined potential, and amplifier means connecting said threshold circuit to said switching means for causing discharge of said capacitor through said primary winding upon actuation of said threshold circuit.

13. Means according to claim 12, further comprising a transformer secondary winding inductively coupled to said primary winding, said secondary winding adapted to be connected for energization of a load with regularly repeated precisely uniform pulses.

14. Means according to claim 12, further comprising a transformer secondary winding inductively coupled to said primary winding and an X-ray tube connected to said secondary winding, whereby said X-ray tube delivers a constant radiation output notwithstanding fluctuations in the voltage of said power supply circuit.

15. Generating means for producing a regularly repeated series of precisely uniform electrical pulses, said generating means comprising in combination, a capacitor, switching means and a transformer primary winding connected in series, a power supply circuit adapted to be energized from a source of alternating current, circuit means including a controllable electron tube connecting said capacitor to said supply circuit to be charged therefrom with said tube in a conductive condition, a threshold circuit connected to said capacitor, said threshold circuit being actuated when said capacitor has become charged to a precisely predetermined voltage, said threshold circuit being connected to said tube to terminate charging of said capacitor upon actuation of said threshold circuit, and pulsing means connected to said switching means for connecting said capacitor to said primary winding for discharge therethrough with said capacitor charged to said predetermined voltage.

16. Generating means according to claim 15, in which said switching means is a thyratron.

17. Generating means according to claim 15, wherein said switching means is a phase shifter connected to said supply circuit.

18. A pulse regulator of the class described, comprising in combination, an input circuit adapted for energization from an alternating current source, an output circuit adapted for connection to utilization means, a pulsing capacitor, circuit control means for connecting said capacitor to said output circuit to produce a pulse therein by discharge of said capacitor, circuit means connecting said capacitor to said input circuit to be charged in a predetermined direction therefrom, and a threshold circuit connected to said capacitor and to said input circuit, said threshold circuit being connected to said circuit control means for actuating said circuit control means and thereby terminating said charging of said capacitor when it has become charged to a predetermined fixed potential determined by said threshold circuit, whereby operation of said circuit control means causing said termination of said charging will simultaneously produce a pulse of predetermined precisely fixed magnitude in said output circuit notwithstanding voltage fluctuations in said alternating current source.

19. A regulator according to claim 18, in which said threshold circuit includes a direct current source of reference potential of precisely constant magnitude and rectifier means connected in series with said source of reference potential for permitting current flow through said threshold circuit only after said capacitor has become charged to a potential exceeding said reference potential.

References Cited in the file of this patent
UNITED STATES PATENTS

| | | |
|---|---|---|
| 2,469,913 | Basham | May 10, 1949 |
| 2,532,117 | Vossberg | Mar. 17, 1953 |